United States Patent [19]
Bromley

[11] 3,816,735
[45] June 11, 1974

[54] MULTI-CHANNEL OPTICAL CORRELATOR SYSTEM

[75] Inventor: Keith Bromley, San Diego, Calif.

[73] Assignee: The United States of America as represented by the Secretary of the Navy, Washington, D.C.

[22] Filed: Mar. 15, 1972

[21] Appl. No.: 234,749

[52] U.S. Cl............ 235/181, 324/77 K, 343/100 CL
[51] Int. Cl. .................... G06g 7/19, G06g 9/00
[58] Field of Search.............. 235/181; 324/77 K; 343/100 CL; 350/DIG. 1

[56] References Cited
UNITED STATES PATENTS

| | | | |
|---|---|---|---|
| 3,184,679 | 5/1965 | Kuehne | 235/181 |
| 3,211,898 | 10/1965 | Fomenko | 235/181 |
| 3,439,155 | 4/1969 | Alexander | 235/181 |
| 3,486,016 | 12/1969 | Faiss | 235/181 |
| 3,492,469 | 1/1970 | Silverman | 235/181 |
| 3,634,749 | 1/1972 | Montgomery | 235/181 |

FOREIGN PATENTS OR APPLICATIONS

| | | | |
|---|---|---|---|
| 119,180 | 11/1970 | Denmark | 235/181 |

OTHER PUBLICATIONS

Talamini et al.: New Target for Radar: Sharper Vision with Optics. Electronics Dec. 27, 1965, p. 58/66.
Leith: Optical Processing Techniques for Simultaneous Pulse Compression and Beam Sharpening; from IEEE Transactions on Aerospace & El. Systems. Vol. AES 4 pages 879–885. No. 6 Nov. 68.

*Primary Examiner*—Felix D. Gruber
*Attorney, Agent, or Firm*—R. S. Sciascia; G. J. Rubens; J. W. McLaren

[57] ABSTRACT

A multi-channel optical correlation system employs non-coherent light to illuminate a mask having a plurality of linearly disposed channels, each of which has recorded information defined by variations in opacity along its linear length. The non-coherent light source is modulated as a function of an unknown input signal and an image of the illuminated mask is formed in a selected image plane. The transmitted image is swept along the axes of the linearly disposed channels in synchronism with the time period of the unknown input signal and means is provided for temporally integrating the light intensity of the swept image along the linear length of each channel. A peak intensity of illumination within any of the channels of the resultant integrated image of the mask at the image plane indicates substantial correlation of the input signal with the recorded information in that particular channel.

10 Claims, 4 Drawing Figures

MULTI-CHANNEL OPTICAL CORRELATOR SYSTEM

BACKGROUND OF THE INVENTION

There are numerous requirements for the classification of an unknown input signal. Such an unknown input signal may be represented in various forms of energy such as sound, electromagnetic, light, etc. It was customary in many prior art systems to convert the signal from its original form of energy to a commensurate electrical signal which is compatible with electronic data processing and computation techniques and equipments. Such electronic equipments, in both digital and analog form, are then employed to perform the task of classifying an unknown incoming signal. This is done by comparison with a stored library of known reference signals.

However, electronic data processing and computation techniques suffer from the disadvantage that they can only process "one-dimensional" inputs, in the sense that an electron flow along a wire has but a single dimension; therefore, the comparisons between the unknown input signal and the stored library of known reference signals must be accomplished sequentially.

Despite the high speed of modern data processing and data computation, this process, because of its "one-dimensional" sequential nature, can take a considerable length of time to the extent that the process may not be a "real-time" procedure. That is to say, that the process is not completed before another unknown input signal has arrived for identification. Of course, those skilled in the art are mindful that an electronic data processing equipments can be arranged in a plurality of parallel equipments but such expansion is costly, adds undesirable complexity, and involves an almost prohibitive number of component elements where a great number of parallel equipments are required.

There are also optical techniques for performing correlation processes to identify unknown incoming signals, but many of these optical techniques depend upon a special coherent source of light, such as a laser, which adds to the complexity and the maintenance of stringent operational performance as well as contributing undesirably to the overall size of the equipment.

Accordingly, there is a need for a "real time" system which will classify an unknown incoming signal rapidly, with a high degree of reliability, but which can be performed by equipment that is simple, compact in size, has a minimum of stringent maintenance requirements, and can readily accommodate a large plurality of stored reference signals for simultaneous processing.

SUMMARY OF THE INVENTION

The concept of the present invention obviates many of the disadvantages of prior art systems and has many desirable advantages which inher in its operation. Because it is an optical system employing optical techniques, the method and concept of the present invention is conducive to the simultaneous processing of an unknown input signal to determine its correlation with one or more of a great number of stored known reference signals which may number as many as one thousand channels or more, for example.

Moreover, the concept and method of the present invention affords the added advantage that it is readily adaptable to accommodate a high density of data points per channel such as, for instance, each channel having the capability of recording and representing 1,000 or more data points. Though in many instances the data points within a channel may be in a simple binary form, the method and concept of the present invention is not so limited but is capable of accommodating any bounded, one-dimensional function in either analog or digital form.

The concept of the present invention contemplates a method and means by which reference signals are recorded on a plurality of adjacent linearly disposed channels. This recording may, in one of its simplest forms, comprise a mask of photographic film in which the reference information linearly disposed along the plurality of channels is defined by variations in opacity along the linear length of each channel.

A light source is positioned to illuminate a mask so that the non-opaque or less opaque portions of the mask permit light to pass therethrough, while the opaque portions of the mask substantially block the passage of light. The light source, incidentally, need not be any particular type of light such as monochromatic, coherent, or laser light, but may be any non-coherent light source of sufficient intensity to meet the design requirements of the system.

An appropriate means is arranged for modulating the intensity of the light source as a function of the unknown, incoming, input signal. A suitable optical arrangement is disposed relative to the mask for forming an image of the illuminated mask in a selected and determinable image plane. Further, an appropriate means is positioned to intercept the image transmitted by the optical means for sweeping the image along the axes of the linearly disposed channels in synchronization with the rate of the incoming signal.

The sweep means may take the form of a rotating mirror, an oscillating mirror, or other suitable arrangement for the purpose of optically sweeping the illuminated image of the mask before it reaches its image plane. At the image plane there is located a means for temporally integrating the light intensity of the swept image along the linear length of each channel for the time duration of the incoming signal.

In one of its simplest and most fundamental forms the means for performing such integration of each channel may include a ground glass plate or its equivalent which, when viewed by the human eye, will perform a light integrating function along the linear length of each channel over the time duration of the input signal because of the persistency of vision of the human eye, provided that a single sweep of the image is accomplished in a sufficiently short time.

As a result of the operation of the system, such integration of the light intensity relative to time along the linear length of each channel will produce a peak intensity of illumination in any channel wherein the recorded information of that channel has a substantial correlation to the unknown input signal. Thus, the channel or channels which are in correlation with the unknown input signal provide classification of that input signal.

Other forms of integrators may be employed advantageously such as a vidicon tube, for example, by means of which the channel having substantial correlation with the unknown input signal is identified by an appropriate output signal from the vidicon tube, rendering a positive designation of the correlated channel by establishing its identification number, for example, or other suitable means. Photographic film can also be used to perform the integration function advantageously.

Because the method and concept of the present invention contemplates an optical system wherein an unknown input signal may be compared with a great plurality of stored known reference signals simultaneously, it is, in effect, a "two dimensional" system which has great speed of operation, not only because of the fact that it is optical in nature, but also because of the simultaneous operation between the unknown input signal and the great plurality of channels containing the stored and known reference signals.

The foregoing description and explanation of operation may be referred to as the "passive" mode of the concept of the present invention where an unknown signal is compared with a plurality of known signals for substantial correlation with one of the known signals for classification. In this mode, the velocity of the swept image must be exactly synchronized with the rate of the incoming signal such that the rate at which the spatial representation of the signal (i.e., the image) passes a given point on the image plane is the same as the rate at which the temporal representation of the signal (i.e., the modulation of the light source) changes at that point.

Additionally, the concept of the present invention and its method of employment is readily adaptable to the identification of a particular doppler-shifted signal so as to identify the speed of a detected target, for example. Such mode of operation of the present invention may be referred to as the "active" mode because it requires a predetermined and known form of signal such as a code signal, for instance. This may be accomplished by recording a code, for instance, of a type which may be used in the signal emitted from a surveillance system, in great multitude of forms, each form being the same code, but doppler-shifted in a different degree to represent different speeds of a detected target. The unknown incoming signal received from the target is processed relative to the great plurality of doppler-shifted code signals as contained in the multitude of channels, and one particular channel is identified as having substantial correlation with the unknown input signal. Adjacent channels will exhibit correlation to a lesser degree in the manner of the "ambiguity function" well-known in radar and sonar signal processing. The signal received from the target which produces the greatest correlation is therefore established as having been doppler-shifted by a known or determinable amount, indicating a particular speed of that target. In this mode, synchronization between the velocity of the swept image and the rate of modulation of the light source is not needed. If the rate of the temporal representation of the signal (i.e., the modulation of the light source) is slightly faster or slower than the rate of translation of the spatial representation of the signal (i.e. the image) for a given channel then they will match for one of the other channels and a correlation peak will be observed in a channel either above or below the one under consideration.

Additionally, range information can be determined from the particular spatial disposition of a peak intensity of illumination along the linear length of the channel which it appears as a function of the speed of propagation of the original signal from which the input signal was developed.

Accordingly, it is a primary object of the present invention to provide an extremely high speed correlation system for identifying unknown input signals by simultaneously comparing such signals with a great plurality of known stored reference data.

An equally important object of the present invention is to provide such capabilities in a system which is simple in concept and operation, compact in size, and inherently possesses a high degree of reliability.

A further object of the present invention is to provide such a system which inherently minimizes stringent performance characteristics of its elements without sacrificing efficiency of operation.

Yet another most important object of the present invention is to provide such a system which is readily adaptable to use non-coherent light.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENT

Figure 1:
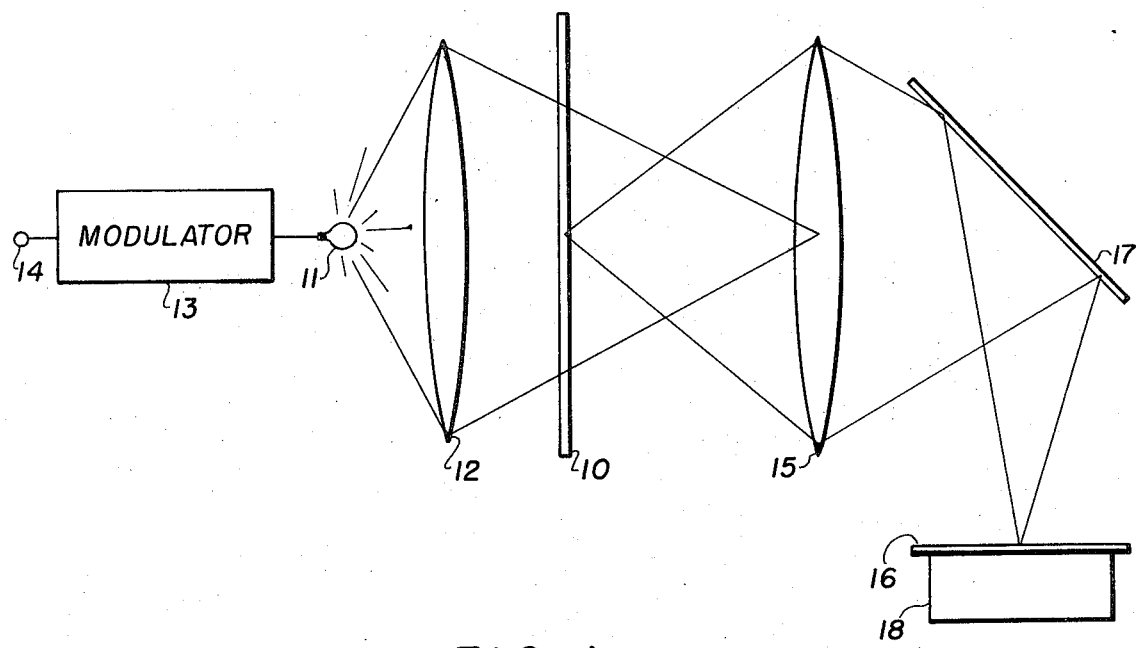
FIG. 1 is a schematic block diagram of an embodiment of the present invention.

In FIG. 1 the concept of the present invention is represented in one of its simplest embodiments and comprises a mask 10, shown in cross-section, which has a plane of linear channels disposed generally from its lower portion in the drawing to the upper portion of the mask. Each of the channels has known recorded information as defined by variations in opacity along its linear length. Such variations in opacity may be in simple binary form as illustrated generally in FIG. 2, for example. However, the concept and method of the present invention is not limited to simple binary form of information but is readily adaptable and suitable for recording known information in any digital or analog form.

A light source 11 which may be non-coherent light, for example, is positioned behind the mask 10 to illuminate it. A condensing lens 12 may be interposed between the light source 11 and the mask 10 to minimize the loss of light energy, though such an optical element is not essential to the concept and method of the present invention.

A modulator 13 is connected between an input terminal 14 and the light source 11 and modulates the intensity of the light source 11 as a function of the amplitude of an unknown input signal received at input terminal 14. An optical means, such as the lens 15, is disposed relative to the illuminated mask 10 for forming its image in a selected image plane. Interposed between the optical means 15 and the image plane 16 is a sweep means 17 for sweeping the image of the illuminated mask along the axes of the linearly disposed channels. A suitable integrator 18 is positioned substantially at the image plane 16 to receive the swept illuminated mask image.

In one of the simplest forms of the present invention, the integration function of the integrator 18 may be performed essentially by the human eye exercising its persistence of vision in conjunction with the visual presentation appearing on a ground glass plate 16. However, in more sophisticated embodiments of the concept and method of the present invention an integrator such as a vidicon tube or photographic film may be employed.

METHOD AND OPERATION OF THE INVENTION

The nature of the present invention is such that it inherently requires the conception of a method comprising a number of operative steps in a particular sequence. Essentially the method involves the steps of (1) recording known signal information as represented by variations in opacity along the linear length of a plurality of channels (2) modulating the illumination of the recorded known signal information as a function of an unknown input signal (3) forming an image of the illuminated recorded known signal information (4) sweeping the image of the illuminated recorded known signal information along the axes of the linear length of the channels in synchronization with the time duration of the unknown input signal and (5) temporally integrating the light intensity of the swept image at the image plane, thereby producing a peak intensity of light in any channel wherein the unknown input signal correlates with the recorded known signal information of that channel.

If the light source modulation is represented by $f(t)$ and the intensity transmittance variation along one channel of the mask is given by $g(x)$, then, sweeping the temporally modulated image across the output plane, the instantaneous intensity in the output plane will be the product, $$f(t)\, g(t-x).$$

Integrating the output plane intensity over a time interval from the beginning of $f(t)$ to the end of $f(t)$, produces a result which may be expressed as, $$\int f(t)\, g(t-x)\, dt$$

which is the correlation integral.

Figure 3:
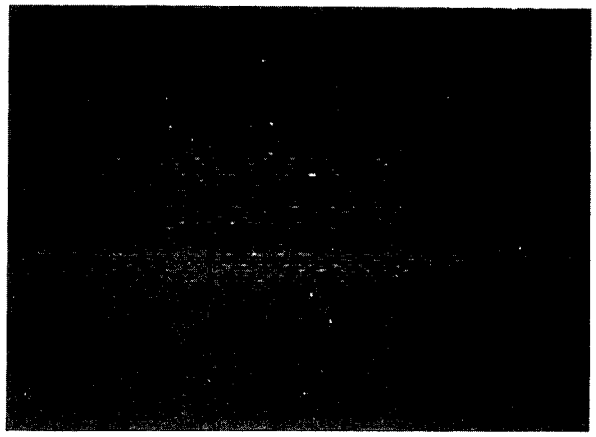
FIG. 3 is an illustration of the resultant integrated image of the mask of FIG. 2 produced by the operation and method of the present invention illustrating a peak intensity in one of the plurality of channels indicative of correlation of an unknown input signal with one of the channels of known recorded information; and, FIG. 4 is an illustration of a mask in which a coded signal is recorded in different form in each channel representing different doppler shifts.

The appearance of the visual presentation at the output plane for a 25 channel mask is shown in FIG. 3. The cross-correlation function between the incoming electrical signal and the stored reference signals is displayed along each on the 25 channels. It is easily seen that the fifth channel from the top contains a bright correlation peak. Hence, the signal $f(t)$ used to modulate the light source correlated very highly with the intensity transmittance variation $g(x)$ across the fifth channel of the mask. In this case, photographic film was used as the integrating device. The light source used may be either coherent or incoherent since neither diffraction nor interference is utilized in this system.

Figure 2:
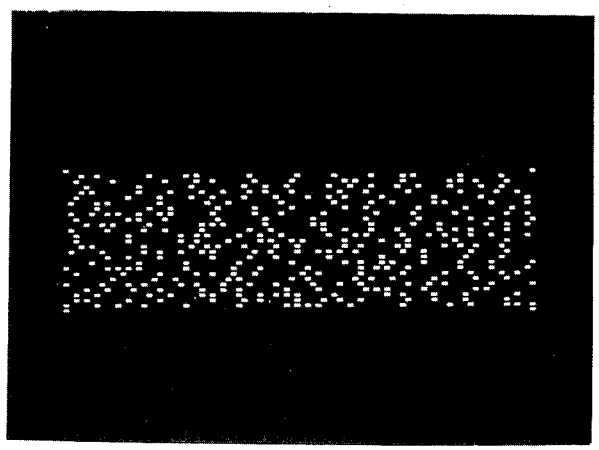
FIG. 2 is an illustration of a mask employed in the present invention and having a plurality of linearly disposed channels, each containing known recorded information defined by variations in the opacity along each channel.

This method is carried out by the operation of the equipment schematically represented in the embodiment of FIG. 1. The mask 10 has recorded upon it a plurality of channels of known signal information. Such a mask may take the form of FIG. 2 wherein 25 different channels of known signal information are recorded in binary form as represented by alternate opaque and non-opaque portions along the channels running from left to right, for example. In FIG. 1 the mask 10 would be disposed so that the left-hand of the mask as illustrated in FIG. 2 would be at the bottom of the schematic drawing of FIG. 1, and the right-hand of the mask illustrated by FIG. 2 would be disposed at the upper portion of the mask 10 in FIG. 1. Accordingly, the twenty-five different channels would be linearly disposed from the bottom of the mask 10, as illustrated in FIG. 1, to the top of the mask 10.

The unknown input signal is received at the terminal 14 and is fed as the input to the modulator 13 for the purpose of modulating a light source 11 as a function of the varying amplitude of the received unknown input signal. The light source 11 may be any suitable light source having adequate speed of response as required by the rate of change in amplitude of the unknown input signal received at the input terminal 14. Such a high speed light source may take the form of a photodiode, for example, in the present state of the art.

The light source 11 thus modulated as a function of the unknown input signal is employed to illuminate the entirety of the mask 10. Such illumination may be enhanced by an appropriate condensing lens 12 so as to conserve the light energy and minimize light losses. The optical element in the form of condensing lens 12 is not essential to the concept of the present invention nor is it essential to the practice of the method of the present invention.

A suitable optical means such as the lens 15 is employed for forming an image of the mask 10 as illuminated by the modulation of the light source 11. Thus, the illuminated recorded known signal information is caused to appear at a known or determinable image plane. The path of that image, is however, intercepted by a suitable sweep means 17 which may take the form, for instance, of a rotating or oscillating mirror for the purpose of sweeping the image of the illuminated mask.

The swept image appears at the image plane 16 where it may be viewed, for example, on a ground glass plate by the human eye. The persistence of vision characteristic of one's eye, acting in conjunction with the optical presentation on the ground glass plate positioned at the image plane 16 performs an integrating function over the time period of the input signal which is synchronized with the sweep. The resulting image will have a clearly discernible peak intensity of light in any channel wherein the known recorded information of that channel substantially correlates with the modulation of the unknown input signal. Thus, such channel may be identified and, since the content of each recorded channel is known, the input signal may be readily classified.

In order to eliminate the fatigue which is incident with the requirement for an observer to constantly view a ground glass plate, for example, at the image plane 16, and also minimize the probability of human error which is necessarily present in such a requirement, any suitable integrator such as a vidicon tube may be placed at the image plane 16 to receive the swept illuminated image of the mask for producing an output responsive to a peak of intensity within one or more channels. Such outputs identify particular channels wherein substantial correlation is realized. The integrating device may be adjusted to be responsive to any desirable threshold of peak intensity for optimum operation in accordance with the particular application made of the concept of the present invention.

It will be appreciated by those skilled and knowledgeable in the art that the present invention, because of its simplified requirements inherent in its ability to employ a non-coherent light source, contributes significantly to the lack of complexity of any system employing its concepts and practicing its method. Moreover, the optical nature of the basic concept of the method of the present invention avails of extremely high speed of operation and as well permits the simultaneous processing of an unknown input signal relative to a great plurality of channels containing known recorded information. As many as 1,000 channels or more are readily encompassed within the capabilities of the present invention.

Additionally, by relating the spaced disposition of a detected peak of intensity in the swept integrated image of the mask employed in the present invention with the propagation speed of the originating signal, range information may be discerned in systems dealing with particular types of input signals such as sonar, radar, etc.

Figure 4:
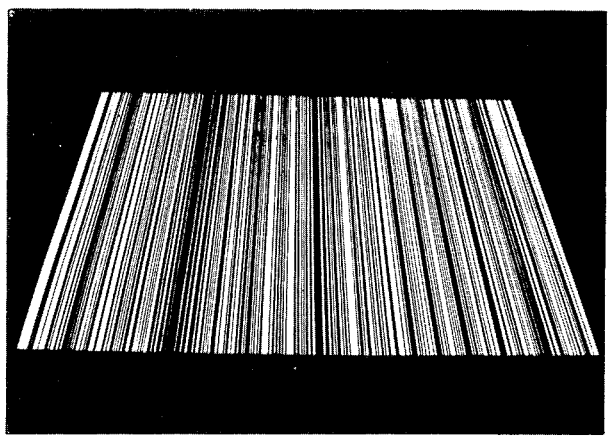

Moreover, another most important aspect of the present invention is the fact that coded signals in binary or other suitable codes may be recorded in multichannel format as shown in FIG. 4, such coded signals representing different degrees of phase shifting so that an input signal may be simultaneously compared with a vast number of like-coded but dissimilar doppler-shifted signals to discern, for example, the speed at which a target is traveling relative to the receiving sensor.

Obviously many modifications and variations of the present invention are possible in the light of the above teachings. It is therefore to be understood that within the scope of the appended claims the invention may be practiced otherwise than as specifically described.

What is claimed is:

1. A multi-channel optical correlation system comprising:
   a mask having a plurality of linearly disposed channels, each said channel having known recorded information defined by variations in opacity along its linear length;
   a light source positioned to illuminate said mask;
   means for modulating the intensity of said light source as a function of an input signal;
   optical means for transmitting image forming light energy of the illuminated mask to a selected image plane;
   means positioned to intercept the image-forming light energy transmitted by said optical means for sweeping said image forming light energy along the axes of said linearly disposed channels; and
   means for integrating the intensity of the swept image light energy along the linear length of each channel over the time period of the input signal for producing the correlation integral $f(t)g(t - x)dt$, where $f(t)$ is the modulation of the light source resultant from the input signal, and $g(x)$ is the light intensity transmittance along a channel;
   whereby a stationary peak intensity of illumination within any of the channels of the resultant integrated image of said mask at said image plane indicates correlation of said input signal with the recorded information of that channel.

2. A system as claimed in claim 1 wherein said input signal is repetitive and said image transmitted by said optical means is swept at the repetition rate of the input signal.

3. A system as claimed in claim 1 wherein said recorded information comprises a code defined by alternate opaque and translucent portions along the linear lengths of each channel.

4. A system as claimed in claim 1 wherein said means for sweeping said image is an oscillating mirror.

5. A system as claimed in claim 1 wherein said means for sweeping said image is a rotating mirror.

6. A system as claimed in claim 1 wherein the information recorded in said channels represents doppler-shifted variations of the same signal.

7. A system as claimed in claim 1 having a condensing lens positioned between said light source and said mask for minimizing the loss of light from said illuminated mask.

8. A system as claimed in claim 1 wherein said means for integrating includes light-sensitive means positioned at said image plane and responsive to a predetermined peak intensity of illumination for producing a signal indicative of the channel wherein said peak intensity occurs.

9. A system as claimed in claim 8 wherein said light-sensitive means is a vidicon tube.

10. A method of classifying an unknown input signal by optical correlation comprising the steps of:
    recording known signal information represented by variations in opacity along the linear length of a plurality of channels;
    modulating the illumination of the recorded known signal information as a function of the unknown input signal;
    forming an image of the illuminated recorded known signal information;
    sweeping the image-forming light energy of the illuminated recorded known signal information along the axes of the linear length of the channels; and
    integrating the light intensity of the swept light energy at the image plane over the time period of the unknown input signal for producing the correlation integral $f(t)g(t - x)dt$ where $f(t)$ is the modulation of the light source resultant from the input signal, and $g(x)$ is the light intensity transmittance along a channel, thereby generating a stationary peak intensity of light in any channel wherein the unknown input signal correlates with the recorded known signal information of that channel.

* * * * *